F. J. KIMBALL.
DISCHARGE-NOZZLE FOR GRAIN-ELEVATORS.
No. 187,536. Patented Feb. 20, 1877.
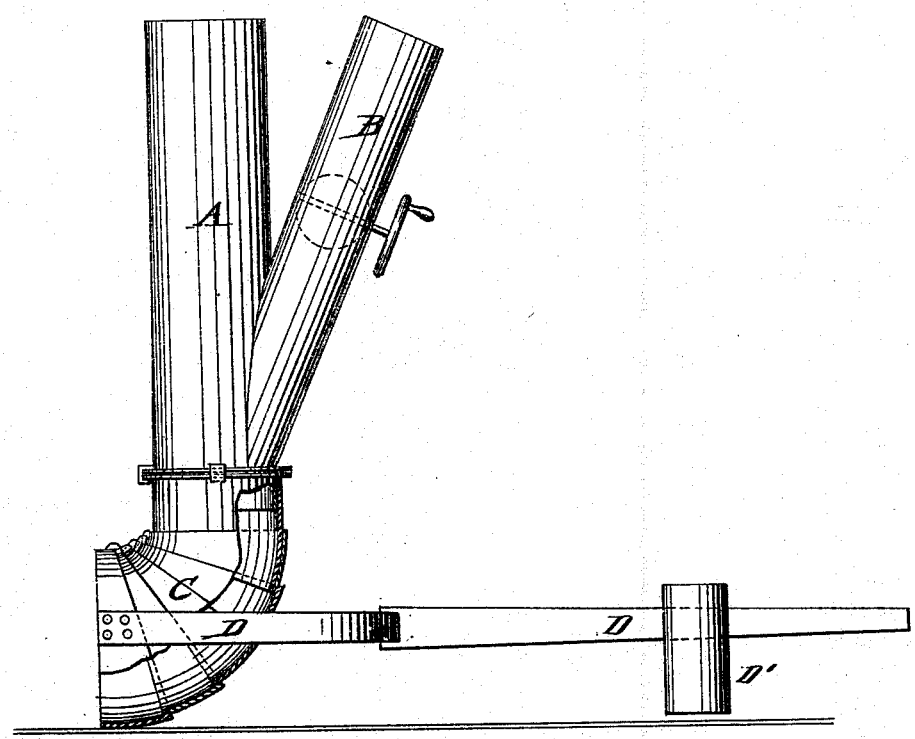
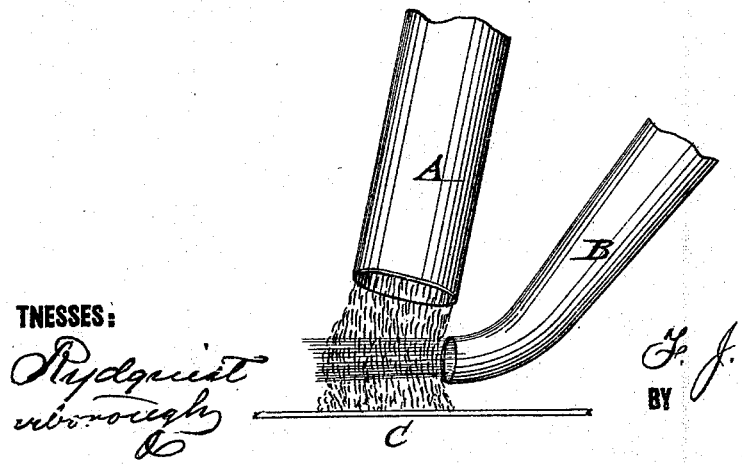

UNITED STATES PATENT OFFICE.

FREDERICK J. KIMBALL, OF PHILADELPHIA, PENNSYLVANIA.

IMPROVEMENT IN DISCHARGE-NOZZLES FOR GRAIN-ELEVATORS.

Specification forming part of Letters Patent No. 187,536, dated February 20, 1877; application filed January 29, 1877.

*To all whom it may concern:*

Be it known that I, FREDERICK J. KIMBALL, of Philadelphia, in the county of Philadelphia and State of Pennsylvania, have invented a new and Improved Discharge-Nozzle for Grain-Elevators, of which the following is a specification:

In the accompanying drawing, Figure 1 represents a sectional side elevation of my improved discharge-nozzle for grain-elevators, and Fig. 2 a simpler form of the same.

Similar letters of reference indicate corresponding parts.

The invention relates to an improved nozzle for the spout of grain-elevators, by which the grain may be discharged into a vessel or car in any direction and angle under pressure of air, so as to dispense with the shoveling off and leveling of the heap of grain forming under the spout of the elevator.

The invention consists of a discharge-spout with a valved air-blast pipe, and a check-plate or telescoping nozzle turning on the spout, and being directed by a forked handle applied thereto.

In the drawing, A represents the spout of the elevator, that is placed over the hold of the vessel or car for trimming in the grain. An air-blast pipe, B, with regulating-valve, opens near the end of spout, and is connected with a blower of suitable power. To the end of the spout is attached, by a flanged guide-joint, a revolving telescopic nozzle, C, that is formed of tapering or sector-shaped parts, which assume the shape of a quadrant or arc of a circle, as desired. To the outermost nozzle-section is applied a fork-shaped handle, D, with a sliding weight, D', that counteracts the weight of the falling grain, and admits, in connection with the joint of the spout, the setting of the nozzle in any direction and position. The power of the air-blast, acting on the grain issuing from the spout, forces the same into any part of the hold of the vessel or car without requiring the shoveling off and leveling of the grain by special hands employed for this purpose. The curved nozzle deflects the grain, and throws it by the force of the air-blast to the required place, providing thus a time and labor saving nozzle for trimming grain into vessels, &c.

In place of the curved and telescoping spout that checks the impetus of the descending grain, and deflects the same in connection with the air-blast, a flat or curved plate may be used, which is independent of or attached to the spout of the leg, the air-blast pipe being arranged so as to enter into the leg or form a separate pipe, acting directly on the issuing grain and check-plate, as shown in Fig. 2.

I prefer, however, for the more convenient trimming in of grain, the telescoping spout, as it facilitates the distribution and direction of the grain.

Having thus described my invention, I claim as new and desire to secure by Letters Patent—

1. A discharge-nozzle for grain-elevators for trimming grain into vessels, &c., consisting of the spout of the elevator-leg, in combination with an air-blast pipe and a check or deflecting plate, substantially as and for the purpose described.

2. A discharge-nozzle for grain-elevators, consisting of an exit-spout, with valved air-blast pipe and telescoping and revolving nozzle, substantially in the manner and for the purpose specified.

3. The combination of the telescoping and revolving nozzle with a forked and weighted governing-handle, for deflecting and directing the issuing grain, substantially as specified.

FREDERICK J. KIMBALL.

Witnesses:
THOMAS HUDSON,
J. H. WOOD.